(12) United States Patent
Tanaka et al.

(10) Patent No.: US 9,614,993 B2
(45) Date of Patent: Apr. 4, 2017

(54) LIGHTING DEVICE AND IMAGE READING DEVICE

(71) Applicant: Konica Minolta, Inc., Chiyoda-ku, Tokyo (JP)

(72) Inventors: Masahiko Tanaka, Toyokawa (JP); Satoko Ohzawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/984,380

(22) Filed: Dec. 30, 2015

(65) Prior Publication Data
US 2016/0198060 A1 Jul. 7, 2016

(30) Foreign Application Priority Data
Jan. 6, 2015 (JP) .................................. 2015-000620

(51) Int. Cl.
H04N 1/04 (2006.01)
F21V 8/00 (2006.01)
G02B 6/00 (2006.01)

(52) U.S. Cl.
CPC ............ *H04N 1/04* (2013.01); *G02B 6/001* (2013.01); *G02B 6/0001* (2013.01); *G02B 2006/0098* (2013.01)

(58) Field of Classification Search
CPC . H04N 1/04; G02B 6/0001; G02B 2006/0098
See application file for complete search history.

(56) References Cited

U.S. PATENT DOCUMENTS

| 6,426,807 B1* | 7/2002 | Kawai | G02B 6/0001 250/227.11 |
|---|---|---|---|
| 8,279,499 B2 | 10/2012 | Wilsher | |
| 2009/0219586 A1* | 9/2009 | Fujimoto | G02B 6/001 358/494 |
| 2010/0014315 A1* | 1/2010 | Fujimoto | G02B 6/001 362/615 |
| 2011/0280036 A1* | 11/2011 | Yi | G02B 6/001 362/551 |

(Continued)

FOREIGN PATENT DOCUMENTS

| JP | 2008-077888 A | 4/2008 |
|---|---|---|
| JP | 2014-007033 A | 1/2014 |

(Continued)

*Primary Examiner* — Cheukfan Lee
(74) *Attorney, Agent, or Firm* — Buchanan Ingersoll & Rooney PC (57) ABSTRACT

A lighting device includes: a point light source; a light guide body which emits light from the point light source in a linear manner; and a connecting member provided on an end on a side of the point light source of the light guide body, wherein the light guide body includes a plurality of rods and a branching unit which branches an entering light beam, the connecting member includes a hole penetrating the connecting member, and the hole becomes wider toward the light guide body and a side surface of the hole inclines with respect to an extending direction of the rods such that a portion in which the light beam reflected by the side surface to enter the light guide body is concentrated on the reflecting surface and a portion in which the light beam is concentrated on the reflecting surface are not overlapped with other.

20 Claims, 5 Drawing Sheets

(56) References Cited

U.S. PATENT DOCUMENTS

| | | | |
|---|---|---|---|
| 2012/0261560 A1* | 10/2012 | Nomoto | G02B 6/0045 250/227.32 |
| 2012/0320599 A1* | 12/2012 | Tanaka | H04N 1/02835 362/296.01 |
| 2014/0140094 A1* | 5/2014 | Miyao | G02B 6/0055 362/609 |
| 2014/0313738 A1* | 10/2014 | Tanaka | G02B 6/001 362/298 |
| 2015/0181070 A1* | 6/2015 | Tanaka | G02B 6/001 358/475 |
| 2015/0234112 A1* | 8/2015 | Wang | G02B 6/0021 362/606 |

FOREIGN PATENT DOCUMENTS

| | | | |
|---|---|---|---|
| JP | 2014216923 A | * | 11/2014 |
| WO | WO 2008/013234 A1 | | 1/2008 |

* cited by examiner

LIGHTING DEVICE AND IMAGE READING DEVICE

The entire disclosure of Japanese Patent Application No. 201.5-000620 filed on Jan. 6, 2015 including description, claims, drawings, and abstract are incorporated herein by reference in its entirety.

BACKGROUND OF THE INVENTION

Field of the Invention

The present invention relates to a lighting device and an image reading device and relates to the image reading device which optically reads reflected light from a document image and the lighting device used therein in detail.

Description of the Related Art

An image reading device referred to as a scanner in general two-dimensionally reads a document image by moving a reading system including a lighting device extending in a main scanning direction or a target to be read such as a document in a sub scanning direction. Conventionally, a fluorescent light is widely used as this type of the light source; recently, however, this is often replaced with an LED for saving power. However, the LED is a point light source different from the fluorescent light. Therefore, a light guide body disclosed in U.S. Pat. No. 8,279,499 is commonly used in the lighting device using the LED as the light source for obtaining line-shaped light distribution required for scanning. It is desired to improve a ratio of a light amount of a right beam emitted from the light guide body to the target to be read to the light amount of the light beam emitted from the LED, that is to say, extraction efficiency of the light beam in the lighting device provided with this type of light guide body (hereinafter, referred to as conventional lighting device).

SUMMARY OF THE INVENTION

An object of the present invention is to provide a lighting device and an image reading device excellent in the extraction efficiency of the light beam.

To achieve the abovementioned object, according to an aspect, a lighting device, reflecting one aspect of the present invention comprises a point light source; a light guide body which emits light from the point light source in a linear manner; and a connecting member provided on an end on a side of the point light source of the light guide body, wherein the light guide body includes a plurality of rods arranged in a predetermined direction including a reflecting surface for emitting entering light in a linear manner and a branching unit which branches an entering light beam toward the plurality of rods, the connecting member includes a hole in which the point light source is fitted, the hole penetrating the connecting member from a side of the point light source to a side of the light guide body, and the hole becomes wider from the point light source toward the light guide body and a side surface of the hole inclines with respect to an extending direction of the rods such that a portion in which the light beam reflected by the side surface to enter the light guide body is concentrated on the reflecting surface and a portion in which the light beam is concentrated on the reflecting surface through the branding unit are not overlapped with other.

An image reading device preferably comprises: the lighting device of Item. 1; and a light receiving device which receives reflected light from a document by the lighting device.

The light beam from the point light source is emitted in a wide range centered in a direction in which the point light source is directed. The light beam directed in a direction different from the direction in which the point light source is directed out of the light beam from the point light source might leak outside without being directed into the light guide body. Herein, the hole in which the point light source is fitted becomes wider from the side of the point light source toward the side of the light guide body in the lighting device according to the first embodiment of the present invention. According to this, the light directed in the direction different from the direction in which the point light source is directed out of the light beam emitted from the point light source abuts a side surface of the hole in which the point light source is fitted to be reflected and is directed into the light guide body. That is to say, in the lighting device according to the first embodiment of the present invention, not only the light emitted from the point light source to be directly directed into the light guide body but also the light directed in the direction different from the direction in which the point light source is directed are directed into the light guide body. As a result, in the lighting device according to the first embodiment of the present invention, the extraction efficiency of the light beam is excellent as compared to that in a conventional lighting device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, a lighting device and an image reading device being one embodiment of the present invention will be described with reference to the drawings. However, the scope of the invention is not limited to the illustrated examples.

Figure 1:
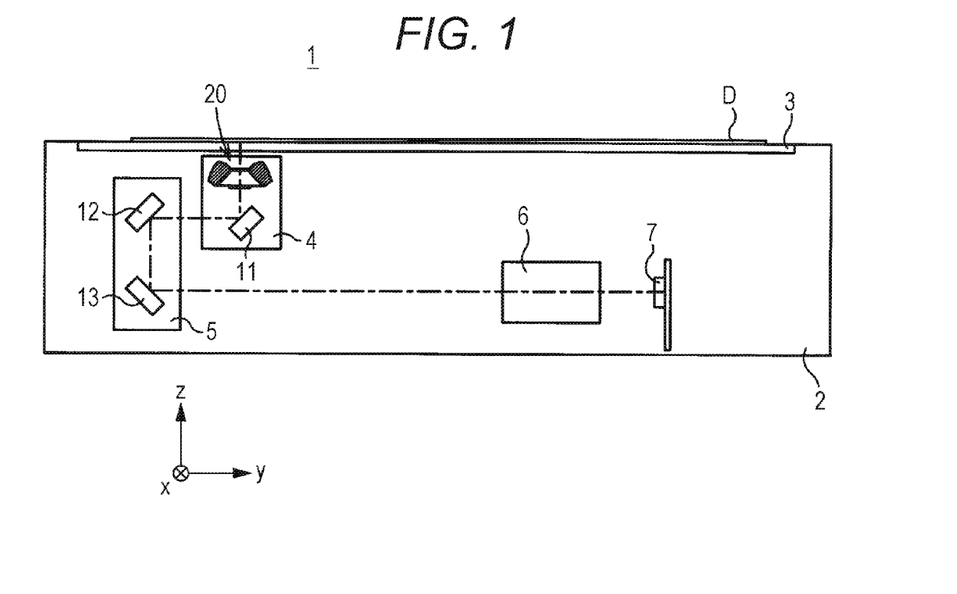
FIG. 1 is a schematic illustrative diagram of an inner portion of an image reading device according to one embodiment.

(Configuration of Image Reading Device; Refer to FIG. 1)

Hereinafter, a main scanning direction, a sub scanning direction, and a vertical direction of the image reading device being one embodiment are referred to as an x-axis direction, a y-axis direction, and a z-axis direction, respectively. Meanwhile, an upstream direction in the sub scanning direction is a negative direction in the y-axis direction, and an upstream direction in the main scanning direction is a negative direction in the x-axis direction.

An image reading device 1 includes a main body 2, a document glass 3, a first slider unit 4, a second slider unit 5, an image forming lens 6, an imaging device 7, mirrors 11, 12, and 13, and a lighting device 20 as illustrated in FIG. 1.

The main body 2 is a rectangular parallelepiped housing to which the document glass 3, the first slider unit 4, the second slider unit 5, the image forming lens 6, the imaging device 7, the mirrors 11, 12, and 13, and the lighting device 20 are attached. The document glass 3 is a rectangular transparent plate attached to an opening provided on an upper surface of the main body 2. A document D is placed on a placing surface being an upper surface of the document glass 3 in a state in which a surface to be read faces downward.

The lighting device 20 emits light from two rods provided therein toward the document D in two directions through the document glass 3. Meanwhile, the lighting device 20 is described later in detail.

The mirror 11 reflects the light reflected by the document D in the negative direction in the y-axis direction as illustrated in FIG. 1. The mirror 12 reflects the light from the mirror 11 downward. The mirror 13 reflects the light from the mirror 12 in a positive direction in the y-axis direction.

Herein, the lighting device 20 and the mirror 11 are mounted on the first slider unit 4 as illustrated in FIG. 1. The first slider unit 4 is moved at a speed V in the positive direction in the y-axis direction along a lower surface of the document glass 3 by a moving unit such as a motor, a belt, and a pulley not illustrated when the document D is being read.

The mirrors 12 and 13 are mounted on the second slider unit 5 as illustrated in FIG. 1. The second slider unit 5 is moved at a speed V/2 in the positive direction in the y-axis direction under the lower surface of the document glass 3 by the moving unit such as the motor, belt, and pulley not illustrated when the document D is being read. According to this, a length of an optical path between the surface to be read of the document D and the imaging device 7 is constant during movement.

The image forming lens 6 forms an optical image obtained by light on the imaging device 7. The imaging device 7 is a light receiving device which receives the light reflected by the document D. Specifically, the imaging device 7 including a one-dimensional imaging area extending in the x-axis direction is a line sensor such as a CCD camera which scans the optical image formed by the image forming lens 6 to take an image of the document D.

When the document D is read by the image reading device 1 configured in the above-described manner, the lighting device 20 emits the light to the document D and the light reflected by the document D is sequentially reflected by the mirrors 11, 12, and 13. The light reflected by the mirror 12 enters the image forming lens 6 and the image is formed on the imaging device 7 by the image forming lens 6. The imaging device 7 performs photoelectric conversion according to intensity of entering light for each pixel, thereby generating an image signal (RGB signal) corresponding to a document image, and outputs the same to a control unit (not illustrated).

(Configuration of Lighting Device; Refer to FIGS. 2 to 7)

Figure 2:
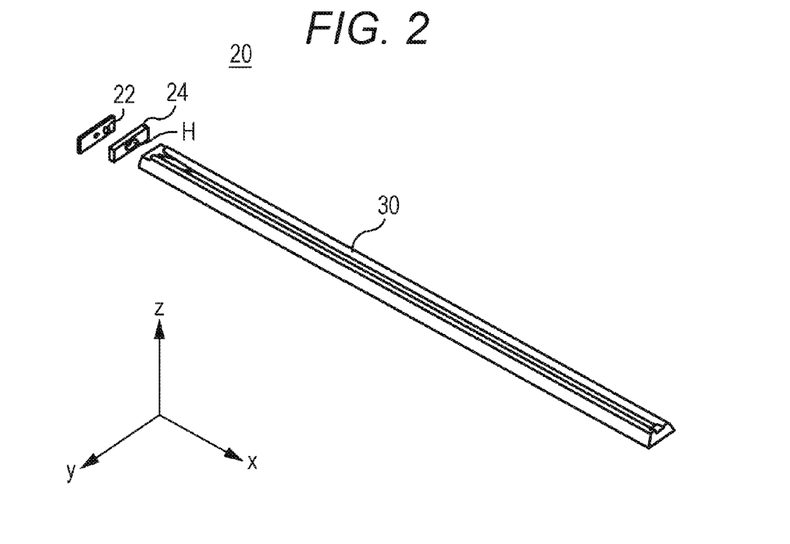
FIG. 2 is an external perspective view of a lighting device according to one embodiment.

The lighting device 20 having a bar shape as a whole extends in the x-axis direction as illustrated in FIG. 2. The lighting device 20 includes a point light source 22, a connecting member 24, and a light guide body 30.

The point light source 22 is an LED which emits white light provided on an end on a negative direction side in the x-axis direction of the lighting device 20 having a half-value angle of 120 degrees.

The light guide body 30 includes a branching unit 32, two rods 34 and 36, and a base 38.

Figure 3:
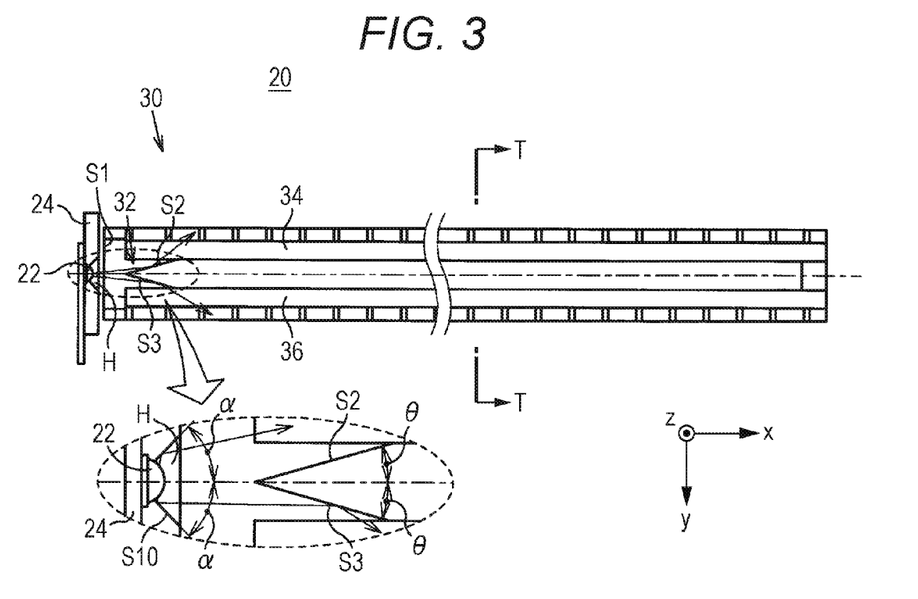
FIG. 3 is a planar view of the lighting device according to one embodiment as seen in a direction perpendicular to a placing surface of a document glass.

The branching unit 32 serves to divide a light beam entering from an entering surface S1 being an end face on the negative direction side in the x-axis direction of the light guide body 30 to guide to the two rods 34 and 36 as illustrated in FIG. 3. The branching unit 32 formed of resin such as PMMA (polymethylmethacrylate) and glass has a V shape. An apex of the V shape of the branching unit 32 is directed in the negative direction in the x-axis direction as seen in the z-axis direction and is located in a position overlapped with an optical axis of the point light source 22 as seen in the z-axis direction.

When the light beam enters the branching unit 32 configured in this manner from the entering surface S1, the light beam is emitted to branching surfaces S2 and S3 being the surfaces on the negative direction side in the x-axis direction of the branching unit 32. Herein, the branching surface S2 is the surface at an angle of θ in the positive direction in the y-axis direction and the branching surface S3 is the surface at an angle of θ in the negative direction in the y-axis direction with respect to the x-axis direction at an angle of 0 degree as seen in the z-axis direction. The light beam emitted to the branching surface S2 is reflected in the negative direction in the y-axis direction to be guided to the rod 34. The light beam emitted to the branching surface S3 is reflected in the positive direction in the y-axis direction to be guided to the rod 36.

Figure 4:
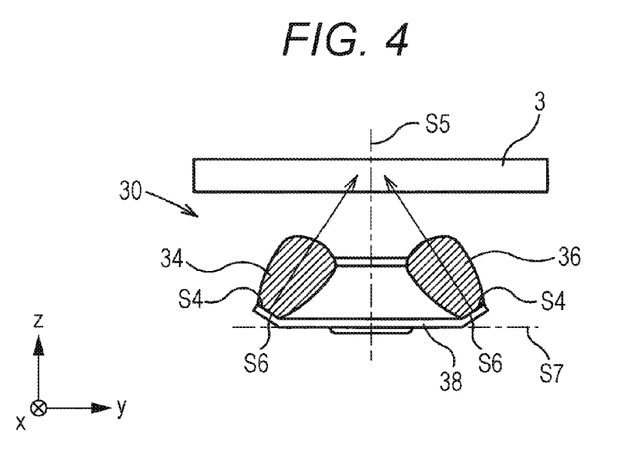
FIG. 4 is a cross-sectional view taken along line T-T in FIG. 3 with a cross-sectional surface of the document glass.
Figure 5:
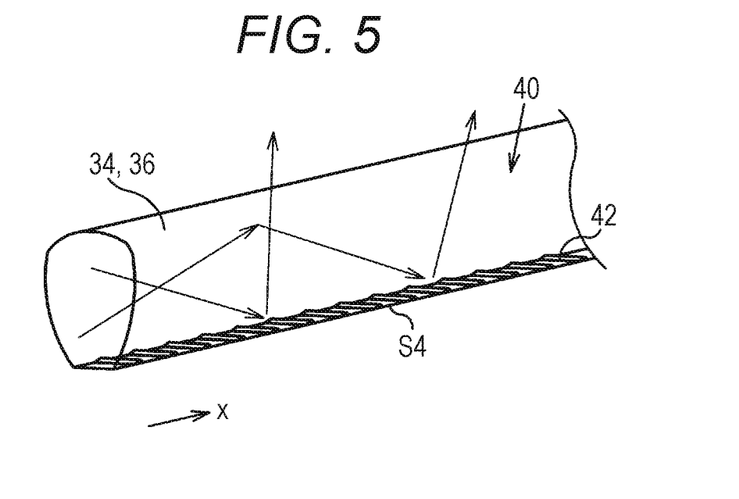
FIG. 5 is a perspective view of a rod according to one embodiment.

The rod 34 is a bar shaped member extending in the x-axis direction formed of the resin such as PMMA (polymethylmethacrylate) and glass. A cross-sectional surface of the rod 34 has a shape obtained by cutting out a lower portion with a large curvature of an oval shape as illustrated in FIG. 4. Furthermore, a prism. 40 formed of a plurality of pieces of unevenness 42 is provided on a reflecting surface S4 located in the lower portion of the rod 34 as illustrated in FIG. 5. In the rod 34 configured in this manner, the light beam guided from the branching unit 32 to the rod 34 is propagated in the main scanning direction while being repeatedly totally reflected in the rod 34. At that time, a part of the propagated light beam is reflected by the prism 40 provided on a lower side of the rod 34 to be emitted toward the document D from an emitting surface located on an upper side of the rod 34.

The rod 36 formed of the same member as that of the rod 34 is arranged so as to be symmetrical to the rod 34 with respect to a plane S5 passing through a center of the light guide body 30 and parallel to the x-axis direction and z-axis direction as seen in the x-axis direction as illustrated in FIG. 4. A function and the like of the rod. 36 is the same as the function and the like of the rod 34 described above, so that the description thereof is omitted.

The base 38 extends in the x-axis direction together with the two rods 34 and 36 to support the rods 34 and 36 from a negative direction side in the z-axis direction of the rods 34 and 36. Surfaces S6 which support the rods 34 and 36 on the base 38 are inclined with respect to a plane S7 parallel to the x-axis direction and y-axis direction for adjusting directions of the light beams emitted from the rods 34 and 36 toward the document D.

The connecting member 24 is a plate-shaped member having a rectangular shape provided between the point light source 22 and the light guide body 30. The connecting member 24 is formed of white resin and the like. Furthermore, a hole H in which the point light source 22 is fitted is provided in a substantially center of the connecting member 24 as illustrated in FIG. 2.

The hole H provided on the connecting member 24 has an elliptical shape with a long axis in the y-axis direction. The hole H becomes wider from the point light source 22 toward the light guide body 30, that is to say, in the positive direction in the x-axis direction as illustrated in FIG. 3. Therefore, the light beam abutting a side surface S10 of the hole H out of the light beam emitted from the point light source 22 is directed to the light guide body 30. Meanwhile, since the connecting member 24 is formed of the white resin, the side surface S10 of the hole H has an excellent reflection rate.

Figure 6:
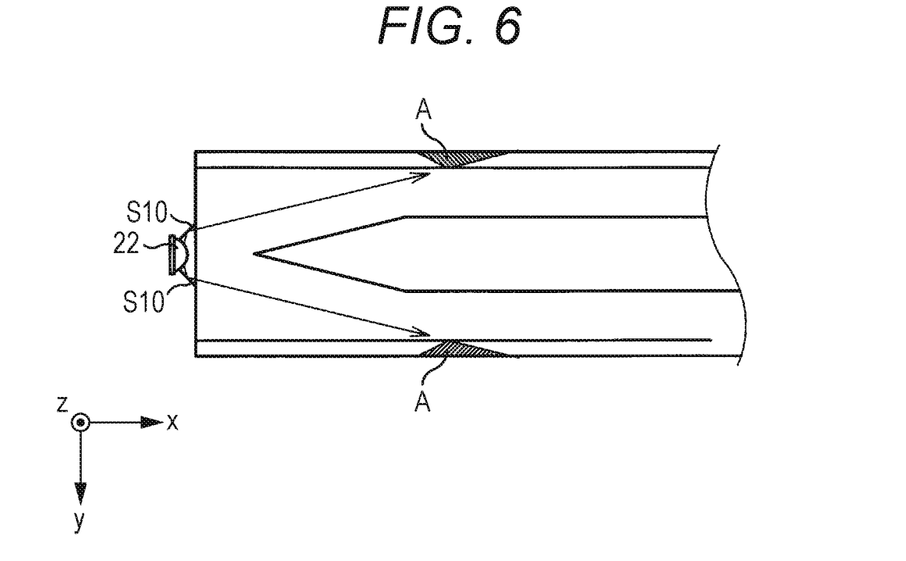
FIG. 6 is a view illustrating a portion in which a light beam from a point light source reflected by a side surface of a hole is concentrated on a reflecting surface of the rod.
Figure 7:
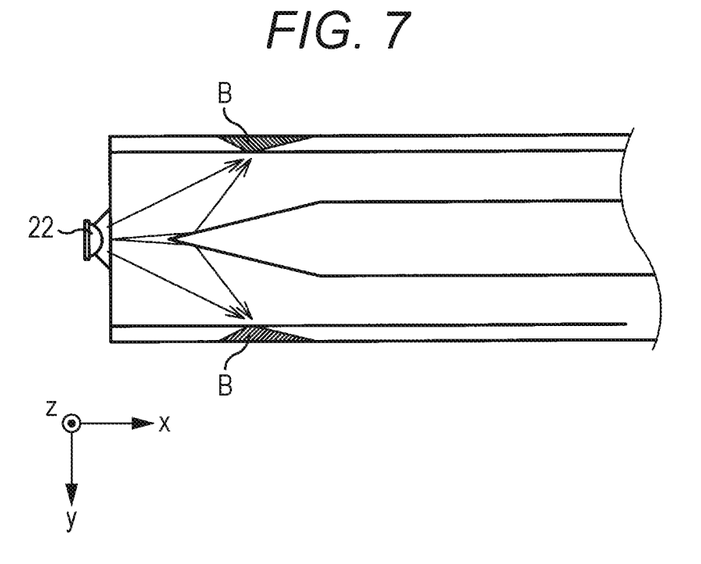
FIG. 7 is a view illustrating a portion in which the light beam emitted from the point light source directly to the rod and the light beam branched by a branching unit to be guided to the rod are concentrated on the reflecting surface of the rod.

The side surface S10 of the hole H is inclined with respect to the x-axis direction because the hole H becomes wider in the positive direction in the x-axis direction. Inclination of the side surface S10 is designed such that portions A in which the light beams reflected by the side surface S10 are concentrated on the reflecting surfaces S4 of the rods 34 and 36 illustrated in FIG. 6 are not overlapped with portions B in which the light beams entering the light guide body 30 without being reflected by the side surface S10 are concentrated on the reflecting surfaces S4 illustrated in FIG. 7. Specifically, an angle α between the side surface S10 and the x-axis direction as seen in the z-axis direction is set to satisfy $2\theta \leq \alpha \leq 4\theta$.

Figure 8:
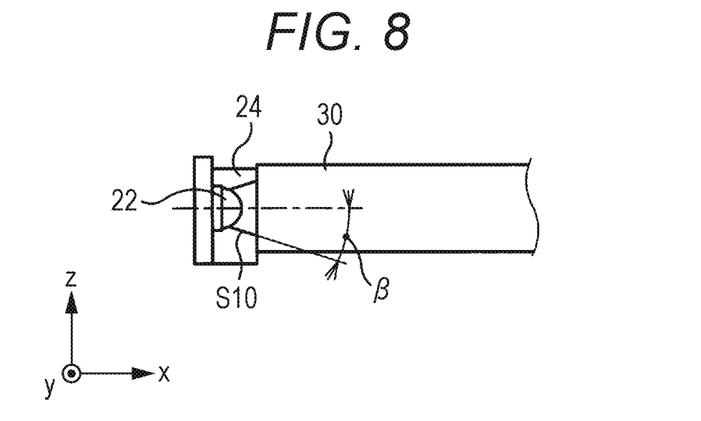
FIG. 8 is a view of a peripheral portion of the point light source of the lighting device according to one embodiment in a direction parallel to the placing surface of the document glass and perpendicular to an extending direction of the rod.

Meanwhile, since the rods 34 and 36 are arranged in the y-axis direction in this embodiment, it is desirable to optimize the angle α between the side surface S10 and the x-axis direction as seen in the z-axis direction illustrated in FIG. 3 rather than optimizing an angle β between the side surface S10 and the x-axis direction as seen in the y-axis direction illustrated in FIG. 8. The shape of the hole H is preferably the elliptical, shape or an oval shape obtained by combining two straight lines and two arcs rather than a rectangular shape for smoothly connecting the angle β between the side surface S10 and the x-axis direction as seen in the y-axis direction and the angle α between the side surface S10 and the x-axis direction as seen in the z-axis direction.

(Effect)

Extraction efficiency of the light beam is excellent in the lighting device 20 configured in the above-described manner. Specifically, the light beam from the point light source 22 is emitted in a wide range centered in a direction in which the point light source 22 is directed, that is to say, the positive direction in the x-axis direction. The light beam directed in a direction different from the direction in which the point light source 22 is directed out of the light beam from the point light source 22, for example, the light beam directed in the positive direction in the y-axis direction might leak outside without being directed into the light guide body 30. Herein, the hole H which the point light source 22 is fitted becomes wider from the point light source 22 toward the light guide body 30 in the lighting device 20. According to this, the light beam directed in the direction different from the direction in which the point light source 22 is directed out of the light beam emitted from the point light source 22 abuts the side surface S10 of the hole H to be reflected and is directed into the light guide body 30. That is to say, in the lighting device 20, not only the light emitted from the point light source 22 to be directly directed into the light guide body 30 but also the light directed in the direction different from the direction in which the point light source 22 is directed are directed into the light guide body 30. As a result, in the lighting device 20, the extraction efficiency of the light beam is excellent as compared to that in a conventional lighting device.

Figure 9:
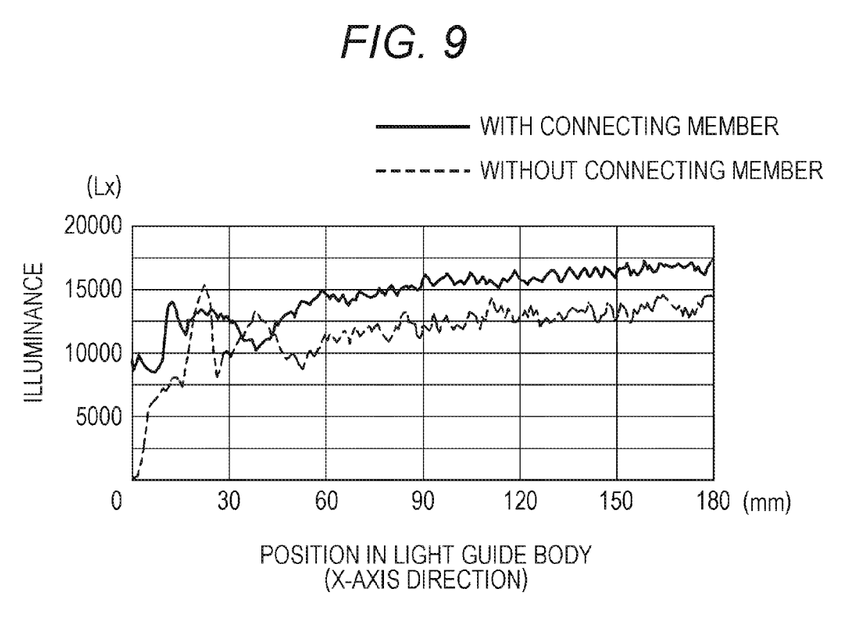
FIG. 9 is a view illustrating distribution of illuminance on the reflecting surface of the rod.

In the light guide body which branches the light beam emitted from one point light source, guides the same to a plurality of rods, and emits the light beams guided to the rods, the light beams emitted from the light source directly to the rod and the light beam branched to be guided to the rod might be concentrated in a specific portion on the reflecting surface of the rod. As a result, a sharp peak of illuminance appears in the specific portion of the reflecting surface of the rod as indicated by a broken line in FIG. 9 and this causes so-called uneven illuminance. Therefore, in the lighting device 20, the side surface S10 of the hole H is designed such that the portions A in which the light beams reflected by the side surface S10 are concentrated on the reflecting surfaces S4 of the rods 34 and 36 are not overlapped with the portions B in which the light beams entering the light guide body 30 without being reflected by the side surface S10 are concentrated on the reflecting surfaces S4. According to this, the illuminance on the reflecting surface of the rod becomes more even as indicated by a solid line in FIG. 9 and the uneven illuminance may be reduced. Meanwhile, the illuminance plotted on an ordinate axis in FIG. 9 is luminance [Lx] on the document glass 3 and an abscissa axis represents a distance from an original point in the x-axis direction, the original point located on the end in the x-axis direction of the light guide body.

The angle α by which the side surface S10 of the hole H inclines with respect to the x-axis direction is set to satisfy $2\theta \leq \alpha \leq 4\theta$ in a relationship with the angle θ by which the branching surfaces S2 and S3 incline with respect to the x-axis direction. It is possible to satisfy both the extraction efficiency of the light beam and reduction in uneven illuminance by setting the angle α of the side surface S10 in this manner. In order to confirm this effect, the inventor of the present application performs simulation regarding the extraction efficiency of the light beam and the reduction in uneven illuminance while changing the angles θ and α. Herein, a result of the simulation regarding the uneven illuminance is illustrated in Table 1 in which a circle mark indicates that the uneven illuminance is less than 2% and the uneven luminance is sufficiently inhibited. Herein, the uneven illuminance is a value obtained by dividing a difference between an illuminance value and a movement average (20 mm section) in each point of 1 mm pitch by movement average illuminance (uneven illuminance=difference from movement average/movement average value). A cross mark in Table 1 indicates that the uneven illuminance is not less than 2% and the uneven illuminance is not sufficiently inhibited. A result of the simulation regarding the extraction efficiency of the light is illustrated in Table 2 in which a circle mark indicates that light extraction efficiency is not less than 20% and the extraction efficiency of the light beam is excellent. A cross mark in Table 2 indicates that the light extraction efficiency is less than 20% and the extraction efficiency of the light beam is not excellent.

TABLE 1

| | | α | | | | | | | | |
|---|---|---|---|---|---|---|---|---|---|---|
| | | 10 | 20 | 30 | 40 | 50 | 60 | 70 | 80 | 90 |
| θ | 10 | X | O | O | O | O | O | O | O | O |
| | 15 | X | X | O | O | O | O | O | O | O |
| | 20 | X | X | X | O | O | O | O | O | O |

TABLE 2

| | | α | | | | | | | | |
|---|---|---|---|---|---|---|---|---|---|---|
| | | 10 | 20 | 30 | 40 | 50 | 60 | 70 | 80 | 90 |
| θ | 10 | O | O | O | O | X | X | X | X | X |
| | 15 | O | O | O | O | O | O | X | x | X |
| | 20 | O | O | O | O | O | O | O | O | X |

As a result of the simulation, it is understood that the uneven illuminance is inhibited if the angle α is not smaller than 20 degrees when the angle θ is 10 degrees as illustrated in Table 1. It is understood that the uneven illuminance is inhibited if the angle α is not smaller than 30 degrees when the angle θ is 15 degrees and if the angle α is not smaller than 40 degrees when the angle θ is 20 degrees. That is to say, it is possible to inhibit, that is to say, reduce the uneven luminance when the angle α is twice the angle θ or larger. Furthermore, it is understood that the extraction efficiency of the light beam is especially excellent if the angle α is not larger than 40 degrees when the angle θ is 10 degrees as illustrated in Table 2. It is understood that the extraction efficiency of the light beam is especially excellent if the angle α is not larger than 60 degrees when the angle θ is 15 degrees and if the angle α is not larger than 80 degrees when the angle θ is 20 degrees. That is to say, the extraction efficiency of the light beam may be especially excellent when the angle α is four times the angle θ or smaller. From above, in the lighting device 20, the angle α by which the side surface S10 of the hole H inclines with respect to the x-axis direction is set to satisfy 2θ≤α≤4θ in the relationship with the angle by which the branching surfaces S2 and S3 incline with respect to the x-axis direction, so that it is possible to satisfy both the extraction efficiency of the light beam and the reduction in uneven illuminance.

Another Embodiment

A lighting device and an image reading device according to the present invention are not limited to those of the above-described embodiment and may be variously modified without departing from the gist thereof. For example, a connecting member may be formed of metal or other materials. At that time, it is possible to improve a reflection rate of a side surface S10 by coating or evaporation coating. A reflecting surface S4 of rods 34 and 36 is not limited to a prism; it is also possible to paint the reflecting surface with white paint by painting or printing to make the same the reflecting surface. A shape of a hole H may be a circular shape or an oval shape obtained by combining two straight lines and two arcs.

As described above, the present invention is useful for the lighting device and the image reading device and is especially excellent in having the excellent extraction efficiency of the light beam in a state in which appropriate light distribution is maintained.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A lighting device comprising:
a point light source;
a light guide body which emits light from the point light source in a linear manner; and
a connecting member provided on an end on a side of the point light source of the light guide body, wherein
the light guide body includes a plurality of rods arranged in a predetermined direction including a reflecting surface for emitting entering light in a linear manner and a branching unit which branches an entering light beam toward the plurality of rods,
the connecting member includes a hole in which the point light source is fitted, the hole penetrating the connecting member from a side of the point light source to a side of the light guide body, and
the hole becomes wider from the point light source toward the light guide body and a surface of the connecting member facing the hole inclines with respect to an extending direction of the rods such that a first portion of the light emitted from the point light source is reflected by the surface to enter the light guide body and is concentrated on the reflecting surface, and a second portion of the light emitted from the point light source is not reflected by the surface and is concentrated on the reflecting surface through the branching unit, wherein the first and second portions are not overlapped with each other.

2. The lighting device according to claim 1, wherein
the branching unit includes a branching surface which reflects the light from the point light source toward one of the plurality of rods, and
an angle between the surface of the connecting member and the extending direction as seen in an orthogonal direction orthogonal to the predetermined direction and the extending direction is twice an angle between the branching surface and the extending direction, or larger, and four times the angle between the branching surface and the extending direction, or smaller.

3. The lighting device according to claim 2, wherein the light guide body is formed of two rods arranged in parallel.

4. The lighting device according to claim 3, wherein the point light source is located in a center of the light guide body in the predetermined direction.

5. The lighting device according to claim 2, wherein the point light source is located in a center of the light guide body in the predetermined direction.

6. The lighting device according to claim 1, wherein the light guide body is formed of two rods arranged in parallel.

7. The lighting device according to claim 6, wherein the branching unit is located between the two rods in the predetermined direction.

8. The lighting device according to claim 6, wherein the point light source is located in a center of the light guide body in the predetermined direction.

9. The lighting device according to claim 1, wherein the point light source is located in a center of the light guide body in the predetermined direction.

10. The lighting device according to claim 9, wherein the branching unit is located in a center of the light guide body in the predetermined direction.

11. The lighting device according to claim 1, wherein the point light source is located on one end side of the light guide body, and the plurality of rods included in the light guide body is connected on another end side of the light guide body.

12. The lighting device according to claim 1, wherein the hole has a circular shape as seen in a central axis direction of the hole.

13. The lighting device according to claim 1, wherein the hole has an oval shape obtained by combining two straight lines and two arcs as seen in a central axis direction of the hole.

14. The lighting device according to claim 1, wherein the hole has an elliptical shape as seen in a central axis direction of the hole.

15. An image reading device comprising:

the lighting device according to claim 1; and a light receiving device which receives reflected light from a document by the lighting device.

16. The image reading device according to claim 15, further comprising a document glass, wherein the lighting device emits light from two rods toward a document in two directions through the document glass.

17. The lighting device according to claim 1, the plurality of rods are located symmetrically with respect to a plane that is parallel to the extending direction of the rods.

18. The lighting device according to claim 17, the reflecting surface inclines with respect to the predetermined direction such that the light emitted from the point light source is reflected to the plane.

19. The lighting device according to claim 18, wherein the light guide body is formed of two rods arranged in parallel, and the point light source is located in a center of the light guide body in the predetermined direction.

20. The lighting device according to claim 1, wherein the light emitted from the point light source not reflected by the side surface and not through the branching unit is concentrated on the second portion.

\* \* \* \* \*